United States Patent
Ikeda

(10) Patent No.: US 8,169,970 B2
(45) Date of Patent: *May 1, 2012

(54) HANDOVER METHOD AND MOBILE COMMUNICATION SYSTEM

(75) Inventor: Shinkichi Ikeda, Kanagawa (JP)

(73) Assignee: Panasonic Corporation, Osaka (JP)

( * ) Notice: Subject to any disclaimer, the term of this patent is extended or adjusted under 35 U.S.C. 154(b) by 445 days.

This patent is subject to a terminal disclaimer.

(21) Appl. No.: 12/401,931

(22) Filed: Mar. 11, 2009

(65) Prior Publication Data

US 2009/0180441 A1 Jul. 16, 2009

Related U.S. Application Data

(63) Continuation of application No. 10/964,162, filed on Oct. 13, 2004, now Pat. No. 7,522,558.

(30) Foreign Application Priority Data

Oct. 17, 2003 (JP) .................................. 2003-357727
Sep. 21, 2004 (JP) .................................. 2004-272866

(51) Int. Cl.
*H04W 4/00* (2009.01)
*H04W 36/00* (2009.01)

(52) U.S. Cl. ...................... 370/331; 370/338; 455/436

(58) Field of Classification Search ............ 370/331, 370/332, 338; 455/436, 437, 438, 439, 440
See application file for complete search history.

(56) References Cited

U.S. PATENT DOCUMENTS

| | | | |
|---|---|---|---|
| 6,430,414 B1 | 8/2002 | Sorokine et al. | |
| 6,870,822 B2 | 3/2005 | Balogh | |
| 6,917,804 B2 | 7/2005 | Takayama et al. | |
| 6,983,149 B2 | 1/2006 | Lindquist et al. | |
| 7,313,119 B2 | 12/2007 | Suh et al. | |
| 2002/0131386 A1 | 9/2002 | Gwon | |
| 2003/0016655 A1 | 1/2003 | Gwon | |
| 2003/0087646 A1 | 5/2003 | Funato et al. | |

FOREIGN PATENT DOCUMENTS

| | | |
|---|---|---|
| JP | 10-89980 A | 4/1998 |
| JP | 2000-341737 A | 12/2000 |
| JP | 2002-112306 A | 12/2000 |
| JP | 2001-103531 | 4/2001 |
| JP | 2001-274816 A | 10/2001 |
| JP | 2002-26931 A | 1/2002 |
| JP | 2002-27519 A | 1/2002 |
| JP | 2002-325275 A | 11/2002 |
| JP | 2003-518889 A | 6/2003 |
| JP | 2005-510913 A | 4/2005 |
| WO | WO 99/41925 | 8/1999 |

OTHER PUBLICATIONS

D. Trossen et al., "A Dynamic Protocol for Candidate Access-Router Discovery, draft-trossen-seamoby-dycard-01.txt", Internet Draft, Mar. 14, 2003.
G. Daley et al., "Movement Detection Optimization in Mobile IPv6, draft-daley-mobileip-movedetect-01.txt", Internet Draft, May 1, 2003.
European Search Report corresponding to Application No. EP 04 02 4337, dated Nov. 24, 2004.

*Primary Examiner* — Quochien B Vuong

(74) *Attorney, Agent, or Firm* — RatnerPrestia

(57) ABSTRACT

In a mobile communication system utilizing Mobile IP, information on the access network is exchanged between access routers. And when a mobile terminal performs a handover, the previously exchanged information on the neighbor access routers and the access network information are provided to the mobile terminal. By so doing, the mobile terminal can determine a destination access router in advance, enabling to realize an efficient handover processing.

8 Claims, 16 Drawing Sheets

Fig.10

| IP Address | Link Layer Address (BSSID) | Frequency | Location | Distance | ESSID |
|---|---|---|---|---|---|
| IPAddr_A | L2Addr_A | f1 | (X1, Y1) | n | BSSID_1 |
| IPAddr_B | L2Addr_B | f2 | (X2, Y2) | m | BSSID_1 |
| IPAddr_C | L2Addr_C | f3 | (X4, Y4) | 1 | BSSID_2 |

70

71
72
73

HANDOVER METHOD AND MOBILE COMMUNICATION SYSTEM

This application is a continuation of U.S. patent application Ser. No. 10/964,162, filed Oct. 13, 2004, the contents of which are incorporated herein by reference.

FIELD OF THE INVENTION

This invention relates to a handover method and a mobile communication system for realizing the communication efficiency by reducing the load that is caused when a mobile terminal, which implements radio communication, searches for a destination access router for a handover in a mobile communication system aiming at the internet access.

BACKGROUND OF THE INVENTION

There is provided the Mobile IP as one of mobility management methods in the internet system, and Mobile IPv4 that corresponds to IPv4 is standardized by RFC3220 (IP Mobility Support). Besides, Mobile IPv6 that corresponds to IPv6, is in process of standardization by the Internet-Draft "draft-ietf-mobileip-ipv6 (Mobility Support in IPv6)" even now. It is possible for a mobile terminal to perform communication with the use of the same address even when it moves between different networks by these protocols.

In Mobile IPv6, the mobile terminal obtains prefix information of the currently connected link from the network information transmitted by the access router connected on the current link when being away from its home link. By this information the mobile terminal forms a care-of address to be used on the link. After that, the care-of address is registered on a home agent on the home link of the mobile terminal as a primary care-of address, by sending a Binding Update Message to the home agent. After receiving the Binding Update Message from the mobile terminal, the home agent creates or updates a binding cache that associates the home address with the care-of address.

The home agent, by referring to the binding cache, intercepts packets sent to the home address on the home link of the mobile terminal, then encapsulates the intercepted packets and then forwards them to the care-of address of the mobile terminal. The mobile terminal de-capsulates the packets forwarded by the home agent to be able to receive the packets sent to the mobile terminal's home address.

Further, there is provided the Fast Handover Method, that is Internet-Draft "draft-ietf-mobileip-fast-mipv6 (Fast Handovers for Mobile IPv6)", to realize a reduction of packet loss, which is one of problems of the Mobile IP. In Mobile IP, packets for the mobile terminal's home address forwarded from the home agent to the old care-of address are discarded during the time when a new care-of address is obtained till registered in the home agent by the mobile terminal because they are impossible to be delivered to the destination address. Therefore there occurs a packet loss. The Fast Handover Method intends to reduce packet loss by buffering and forwarding packets for the mobile terminal between the access router currently connecting to the mobile terminal and a destination access router. However, the problem is how to specify the destination access router.

As for the conventional handover methods to solve this problem, there is one for example like a description in Japanese Non-examined Patent Publication 2001-103531.

FIG. 16 is a functional block diagram of the conventional base station device.

In FIG. 16, a base station switchover information receiving circuit 1022 of the base station device 1002 obtains a base station switchover information including information on the base station to which the mobile terminal is previously connected (hereinafter referred to as "previously-connected base station") and then a base station switchover information transmitting circuit 1023 sends it to the previously-connected base station via a wired local network connected by a network transmission/reception circuit. In the previously-connected base station, when a base station switchover information receiving circuit 1026 receives the base station switchover information from a base station to which the mobile terminal is newly connected (hereinafter referred to as "destination base station"), a terminal station information/base station information controller 1027 stores it. After that, a selection preference transmitting circuit 1024 statistically estimates a base station to become a potential movement destination from the self-station for the mobile terminal, and a base station information transmitting circuit 1025 provides it to the mobile terminal. By doing so, it is possible for the mobile terminal to determine a base station to become a handover-destination in advance, thus enabling to reduce a packet loss more certainly by used together with the Fast Handover Method.

In the mobile communication system using the conventional Mobile IP, in order to reduce a packet loss accompanied by the mobile terminal's handover, a destination access router or a base station is to be estimated and then packets are buffered and forwarded. However, it is necessary that the information for estimating a movement destination should be input into all the access routers or base stations by hand. Therefore it is a problem to reduce the configuration load especially in the case of a large-scale network environment. Besides, in Japanese Non-examined Patent Publication 2001-103531 disclosed as a way for solving the problem, there is such an improvement that information for estimating a movement destination can be automatically configured. However in this way, because movement destination is estimated by performing a statistical work based on the previous connection information, if a new base station is allocated, there is a time required before the necessary information is stored up. As a result, there is a possibility that uncertain handover is compelled in the meantime.

SUMMARY OF THE INVENTION

Accordingly, an object of the present invention is to solve the above-described conventional problem, realizing a handover that enables automatic configuration of information for estimating a destination access router and further enables to dispense with the time for storing up the information to exclude uncertain elements.

In accordance with a first aspect of the present invention for solving the above problem, there is provided a handover method for mobile communication system configured by: an access router including a backbone network interface connected to a backbone network and an access network interface connected to an access network; and a mobile terminal connected to the backbone network via the access router as moving through the access network. In this system, the access router sends access network interface information on the access network interface to the backbone network. The access router receiving the access network interface information from another access router stores it as neighbor access network information and notifies it as information for a candidate destination router to the mobile terminal at the time of handover performed thereby. The mobile terminal that obtains the information for a candidate destination router determines a destination router based on the information to perform the handover processing. By virtue of the features as described, configuration can be performed autonomously between access routers, and further it is possible to select a destination access router with more certainty by including location information into the configuration information to be exchanged between access routers. In addition, by providing the access network interface information, it enables to reduce the uncertain handover to be occurred immediately after the configuration of a new access router.

In addition, in accordance with a second aspect of the present invention, there is provided a handover method including the steps of: a first access router multicast-sending access network interface information regarding an interface connected to an access network at a specific radio frequency, toward a wired backbone network; a second access router storing the access network interface information received from the first access router as neighbor access network information; the second access router notifying all or a part of the neighbor access network information as information for a candidate destination router to the mobile terminal when the mobile terminal on the access network implements a handover; and the mobile terminal determining a destination access router based on the obtained information for a candidate destination router to implement the handover processing.

By virtue of the features as described, it allows the access network interface information to be autonomously exchanged between access routers so that it enables to follow the changing network configuration in real time, provide the latest destination router information constantly for the mobile terminal, thus realizing an efficient handover.

In addition, in accordance with a third aspect of the present invention, there is provided a handover method, wherein the access network interface information includes an address granted to an access network interface and the self-location information, characterized in that a second access router figures out if the location is within the range of a predetermined distance on the basis of the location information on the received access network interface information and the self-location, handling one or more of the access network interface information regarding access routers within the range of the predetermined distance as the neighbor access network information.

By virtue of the features as described, suitable destination router information can be provided to the mobile terminal because only neighbor information is extracted based on the location information. Further, because necessary information can be notified to the prior-to-movement access router when used together with the Fast Handover Method that is examined by IETF, it is possible to realize a furthermore efficient handover.

In addition, in accordance with a fourth aspect of the present invention, there is provided a handover method, wherein the mobile terminal determines a first access router with the shortest distance from the self-location as its destination access router on the basis of the information for a candidate destination router received by the mobile terminal, and implements the handover processing.

By virtue of the features as described, it is possible for the mobile terminal to initiate handover to an access router having the highest connectibility.

In addition, in accordance with a fifth aspect of the present invention, there is provided a handover method, wherein a second access router stores the access network interface information as the neighbor access network information in the order of increasing distance from the self-location.

By virtue of features as described, because access routers draw up information in the order of increasing distance from the self-station in advance, it is made possible to provide information rapidly at the request of the mobile terminal.

In addition, in accordance with a sixth aspect of the present invention, there is provided a handover method, wherein a second access router notifies to the mobile terminal of the access network interface information included in the neighbor access network information as the information for a candidate destination router after drawing them up in the order of increasing distance from the self-location.

By virtue of the features as described, because the mobile terminal refers in determining its destination router in the order of descending preference, it is natural for the mobile terminal to search for its destination access router from its neighbors. As a result, it allows the mobile terminal to reduce the processing time used in determining its destination router.

In addition, in accordance with a seventh aspect of the present invention, there is provided a handover method, wherein the access network interface information is added to a Router Advertisement Message.

By virtue of the features as described, it allows to realize an efficient handover while being compatible with the existing networks.

In addition, in accordance with a eighth aspect of the present invention, there is provided a handover method, wherein the access network interface information includes a network identifier for identifying an access network and the mobile terminal determines the destination access router out of access routers with a connectable network identifier on the basis of the information for a candidate destination router.

By virtue of the features as described, it enables to avoid such a useless operation as trying to connect with an access router that is actually unable to connect, thus allowing to complete the handover processing constantly at high speed.

In accordance with a ninth aspect of the present invention, there is provided an access router including: an access network information processor that collects access network interface information regarding an interface connected with an access network at a specific radio frequency and multicast-sends it to a wired backbone network; a neighbor access network information processor for storing the received access network interface information as a neighbor access network information; and a candidate destination router information processor for notifying a mobile terminal of all or a part of the access network interface information stored in the neighbor access network information processor as information for a candidate destination router, when the handover initiation is notified by the mobile terminal on the access network.

By virtue of the features as described, exchange of the access network interface information can be autonomously conducted between access routers. As a result, it allows to follow the change of network configuration in real time to provide the mobile terminal with the latest destination router information constantly, thus realizing an efficient handover.

In addition, in accordance with a tenth aspect of the present invention, there is provided an access router further includes an location information controller for detecting the self-location to be controlled as location information, wherein the access network information processor adds the location information to the access network interface information to transmit, while the neighbor access network information processor figures out if the distance is within a predetermined range from the self-location based on the received location information on other access routers and the self-location obtained from the location information controller to store the access network interface information sent by the other access routers within the predetermined distance as the neighbor access network information.

By virtue of the features as described, only neighbor information can be stored on the basis of the location information. As a result, it enables to limit the selection objects as well as enables to dissipate useless usage of memory area occupied by unnecessary information.

In addition, in accordance with an eleventh aspect of the present invention, there is provided an access router, wherein the access network interface information at least includes an address added to the access network interface and information on radio frequency at which communicated with the access network.

By virtue of the features as described, the mobile terminal can communication without performing a frequency search because the access router can notify the mobile terminal of the radio frequency at which being connected with a destination access router. Besides, it enables to obtain information necessary for used together with the Fast Handover Method examined by IETF, thus realizing a more efficient handover.

In addition, in accordance with a twelfth aspect of the present invention, there is provided an access router, wherein the access network interface information further includes a network identifier for identifying the access network.

By virtue of the features as described, it can avoid such a useless operation as trying to connect with an access router that is actually unable to connect, thus enabling to constantly complete the handover processing at high speed.

In addition, in accordance with a thirteenth aspect of the present invention, there is provided an access router, wherein the neighbor access network information stores the access network interface information in the order of increasing distance of an access router from the self-location.

By virtue of the features as described, it is made possible to provide information promptly at the request of the mobile terminal because the access router draws up information in advance in the order of increasing distance from the self-station.

In addition, in accordance with a fourteenth aspect of the present invention, there is provided an access router, wherein the candidate destination router information processor extracts the access network interface information of an access router that is within the range of an predetermined distance from the self-location out of the neighbor access network information processor, then drawing up the information in the order of increasing distance from the self-location to notify to the mobile terminal as the information for a candidate destination router.

By virtue of the features as described, it allows to naturally search the neighbor access routers for a destination router because the mobile terminal refers to in the order of descending preference when determining the destination router. As a result, it is made possible for the mobile terminal to reduce the processing time for determining a destination router, thus enabling to provide the mobile terminal with the latest neighbor information.

In addition, in accordance with a fifteenth aspect of the present invention, there is provided an access router, wherein the access network information processor adds the access network interface information to a Router Advertisement Message for transmitting.

By virtue of the features as described, it can realize an efficient handover while keeping compatibility with the existing network.

In accordance with a sixteenth aspect of the present invention, there is provided a mobile terminal that is connected with the backbone network via access routers communicating at each of specific radio frequencies as moving through the access network, the mobile terminal including: a destination router selector for determining a destination access router by obtaining a information for a candidate destination router including the address of an access router that is a candidate for destination connection and the specific radio frequency information out of the access router which has connected; and a handover controller for initiating a handover processing with the destination access router at the obtained radio frequency in response to the determination made by the destination router selector.

By virtue of the features as described, the mobile terminal can determine the destination access router before initiating the handover to know the radio frequency for connecting with the destination access router. As a result, it enables to communicate with the destination access router without a frequency search. Further, necessary information can be obtained when used together with the Fast Handover Method examined by IETF, thus realizing an efficient handover to reduce a packet loss occurred at the time of handover.

In addition, in accordance with a seventeenth aspect of the present invention, there is provided a mobile terminal, wherein the destination router selector sends a Handover Request Message for requesting for the information for a candidate destination router to the currently connected access router prior to the initiation of handover.

By virtue of the features as described, it is made possible for the mobile terminal to obtain the information for a candidate destination router from the access router only when necessary.

In addition, in accordance with an eighteenth aspect of the present invention, there is provided a mobile terminal further including a location information controller for detecting the self-location and controlling it as a location information, wherein the information for a candidate destination router includes the location information of an access router that is the connection candidate, and the destination router selector determines an access router that is located at the shortest distance from the self-location as a destination access router, on the basis of the location information notified from the location information controller and the location information included in the obtained information for a candidate destination router.

By virtue of the features as described, the mobile terminal can determine the destination access router out of access routers notified as the connection candidate with a certainty, thus enabling to improve the efficiency of handover.

In addition, in accordance with a nineteenth aspect of the present invention, there is provided a mobile terminal, wherein the information for a candidate destination router is drawn up in the order of descending preference for selection, thus the destination router selector enabling to determine an access router described on top of the obtained information for a candidate destination router, as the destination access router.

By virtue of the features as described, by referring from top of the provided information in sequence in the case of selecting the destination router, it is possible to naturally search for the destination router in the order of increasing distance from the self-location. As a result, the processing time can be reduced.

In addition, in accordance with a twentieth aspect of the present invention, there is provided a mobile terminal, wherein the information for a candidate destination router further includes a network identifier for identifying the access network, the destination router selector determining the destination access router out of access routers having a network identifier allowed to connect, on the basis of the obtained network identifier.

By virtue of the features as described, it enables to avoid such a useless operation as trying to connect with an access router that is actually unable to connect, thus enabling to complete the handover processing constantly at high speed.

In accordance with a twenty-first aspect of the present invention, there is provided a mobile communication system, configured by a wired backbone network for connecting with an external network, an access network for communicating at a specific radio frequency, an access router including an access network information processor for collecting an access network interface information regarding an interface for the access network so that the information can be multi-cast-transmitted toward the backbone network, a neighbor access network information processor for storing the received access network interface information as a neighbor access network information, and a candidate destination router information processor for notifying a mobile terminal of all/a part of the access network interface information stored in the neighbor access network information processor as the information for a candidate destination router when notified of the initiation of handover from the mobile terminal on the access network, and a mobile terminal including a destination router selector for obtaining the information for a candidate destination router including the address of an access router that is a candidate for destination connection and the specific radio frequency information to determine a destination access router, and a handover controller for initiating the handover with the destination access router at the obtained radio frequency in response to the determination made by the destination router selector.

By virtue of the features as described, the access network interface information can be autonomously exchanged between access routers. As a result, it can follow the changing configuration of network in real time, enabling to constantly provide the mobile terminal with the latest destination router information to realize an efficient handover.

BRIEF DESCRIPTION OF THE DRAWINGS

FIG. 10 is a table illustrating a configuration of a neighbor access network information table according to Embodiment 1 of the present invention.

DESCRIPTION OF THE PREFERRED EMBODIMENT

Exemplary embodiments of the present invention are demonstrated hereinafter with reference to the accompanying drawings.

1st Exemplary Embodiment

The first embodiment of the present invention is demonstrated hereinafter with reference to the drawings.

Figure 8:
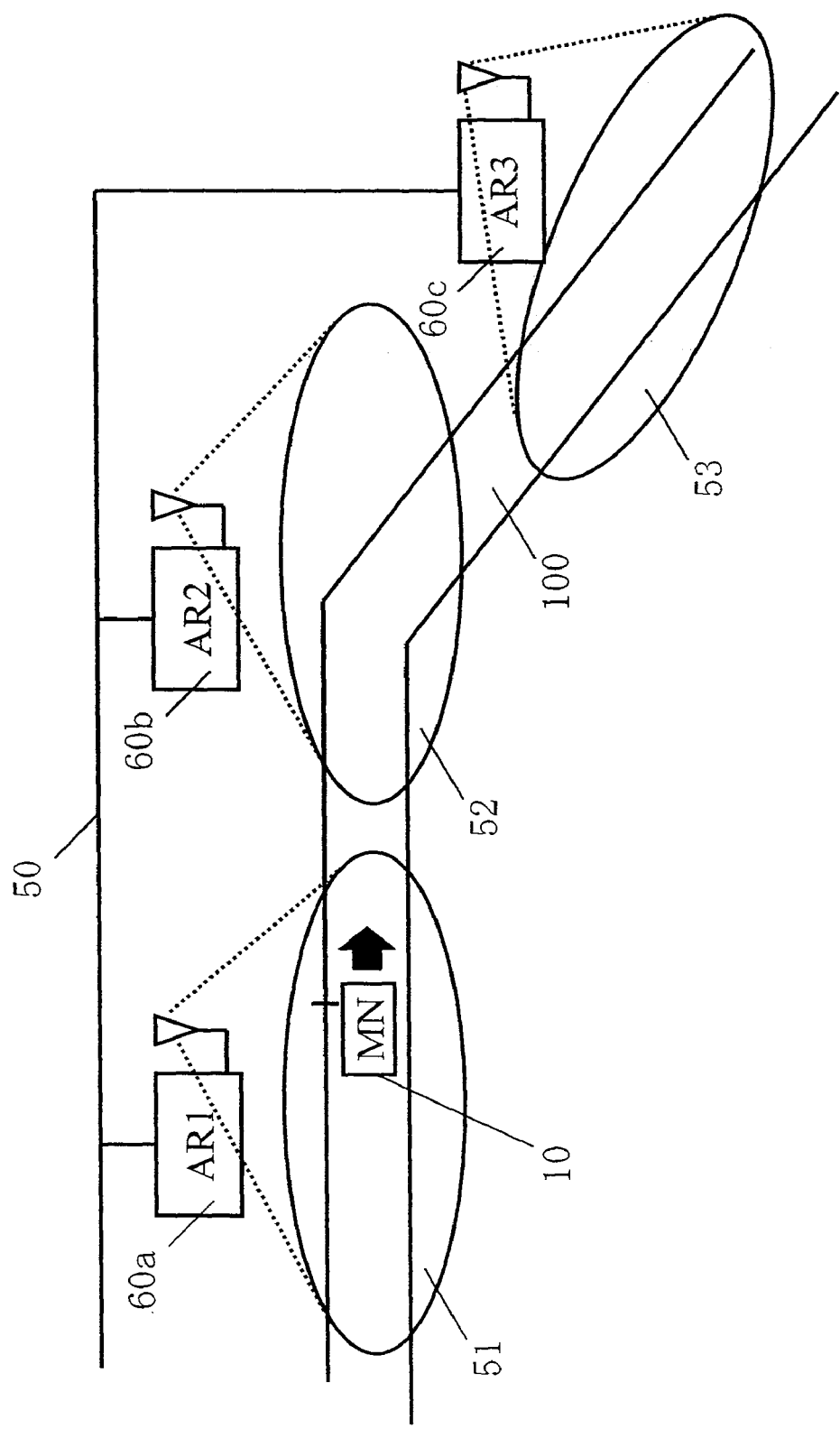
FIG. 8 is a diagram illustrating a configuration of the mobile communication system according to Embodiment 1 of the present invention.

FIG. 8 is a diagram illustrating a configuration of a mobile communication system according to the present invention. In FIG. 8, the access routers (AR1 to AR3) 60*a* to 60*c* that form the radio areas 51 to 53 arranged along the passageway 100 are connected each other by the backbone network 50. The mobile terminal (MN) 10 moves along the passageway 100, as communicating with the access routers 60*a* to 60*c* in respectively different frequency bands. During this time, the mobile terminal 10 performs a handover processing in moving from the radio area 51 to 52, and from the radio area 52 to 53.

Incidentally, the radio areas 51 to 53 are to be also described hereinafter as an access network connecting the mobile terminal 10 with the access routers 60*a* to 60*c*.

Next, configuration and its operation of each of the devices will be demonstrated with reference to the drawings.

Figure 1:
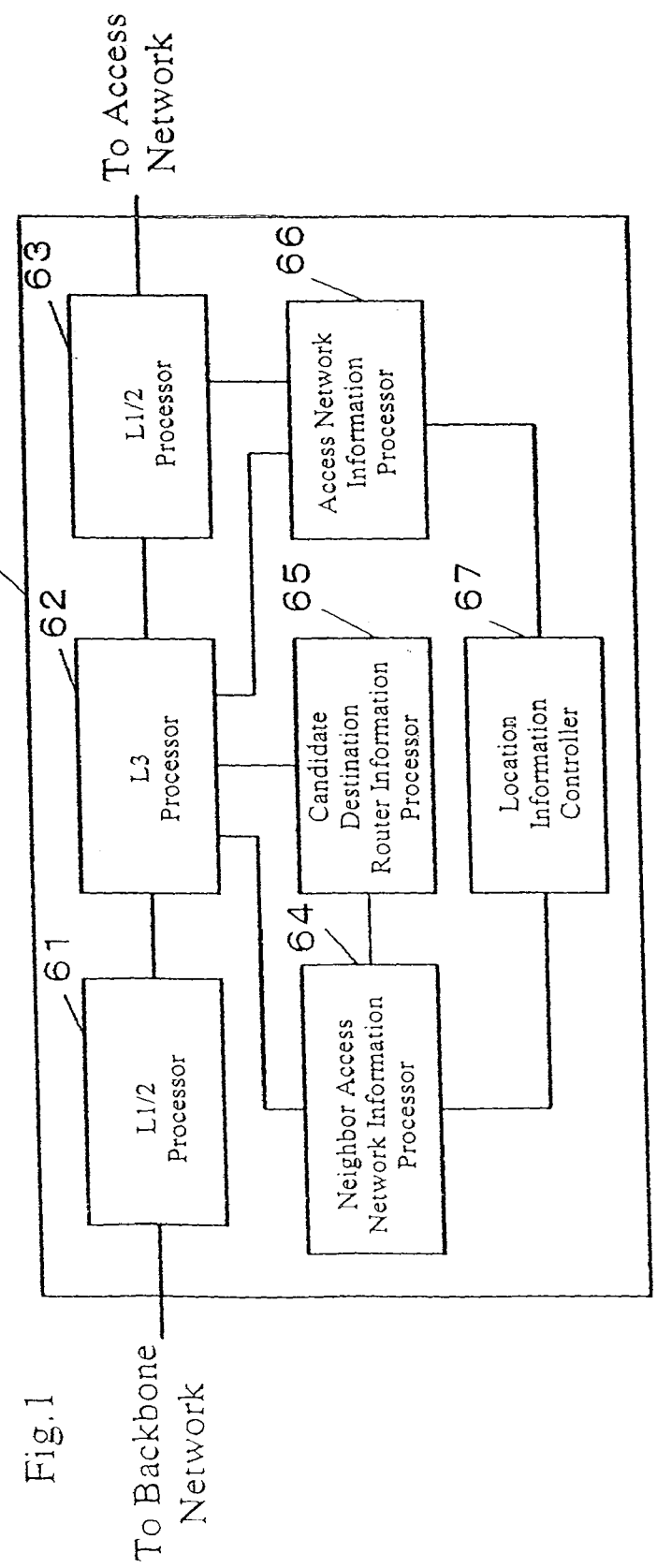
FIG. 1 is a block diagram illustrating a configuration of an access router according to Embodiment 1 of the present invention.

FIG. 1 is a block diagram of the access router 60. In FIG. 1, a L1/2 processor 61 connects to the backbone network 50 for performing a physical layer processing and a data-link layer processing. A L1/2 processor 63 connects to the access network for performing a physical layer processing and a data-link layer processing. A L3 processor 62 performs a network layer processing, such as IP protocol. A neighbor access network information processor 64 includes a neighbor access network information table 70 for controlling it. A candidate destination router information processor 65 notifies the mobile terminal 10 of information on candidate destination routers at the request thereof. An access network information processor 66 extracts access network interface information to be inserted into a Router Advertisement Message 200 that is to be delivered to the backbone network 50. A location information controller 67 detects a spatial location by using GPS or so on to control it as location information.

Incidentally there are only two L1/2 processors 61 and 63 illustrated in FIG. 1 to be connected with the networks. However, under the condition that whether they are connected to the access network or to the backbone network should be clarified, more L1/2 processors may be included in the configuration, wherein the number of the L1/2 processor to be included is not limited to by the present invention. In the case of including three L1/2 processors or more, it is possible to realize the operation by means of a similar configuration and procedure as described hereinafter.

In addition, if the Fast Handover Method examined by IETF is to be implemented in the access router 60, the relevant processing is to be performed in the L3 processor 62.

The basic operation of the access router 60 as configured in the above will be demonstrated hereinafter.

The packet exchange operation for the access router 60 according to the present embodiment is as follows.

After L1/2 processor 63 performs a physical layer processing and a data-link layer processing and the L3 processor 62 performs IP protocol processing including a routing process, a frame received from the access network by the radio communication in f1-frequency band is then forwarded to either of the L1/2 processors 61 or 63. As for the packets received from the backbone network 50, as a result of the routing process by the L3 processor 62 after processed by the L1/2 processor 61, they are to be forwarded to either of the L1/2 processors 61 or 63.

Incidentally, the L3 processor 62 delivers information on its own station towards the connected networks (herein representing the backbone network and access network) as a Router Advertisement Message 200 periodically, at the request of external party or at the time when the access router 60 activates or terminates.

Figure 4:
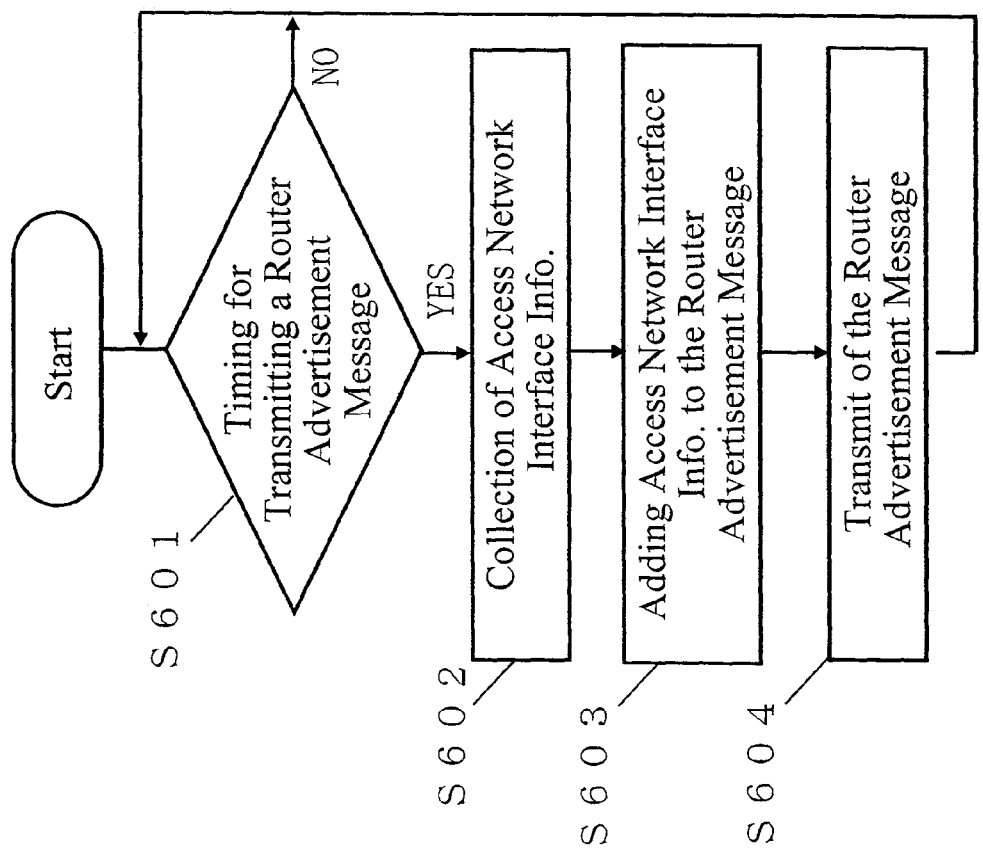
FIG. 4 is a flow chart showing a first operation of the access router according to Embodiment 1 of the present invention.

Next is explained the operation of the L3 processor 62 in delivering the Router Advertisement Message 200 with reference to the flow chart FIG. 4.

First, in the case of delivering the Router Advertisement Message 200 to the backbone network 50 (S601), the access network information processor 66 is to notify an access network interface information about the access network interface to the L3 processor 62 (S602) by collecting, for example, a link layer address, more than one radio communication frequency held by the L1/2 processor 63, more than one IP address for the L1/2 processor 63 held by the L3 processor 62, and the location information of itself held by the location information controller 67.

The L3 processor 62 describes the access network interface information on the Router Advertisement Message 200 (S603) and delivers it to the backbone network via the L1/2 processor 63 (S604). In addition, the L3 processor 62 may obtain a ESSID (Extended Service Set Identifier) for identifying the networks held by the L1/2 processor 63 to add it to the access network interface information.

Figure 11:
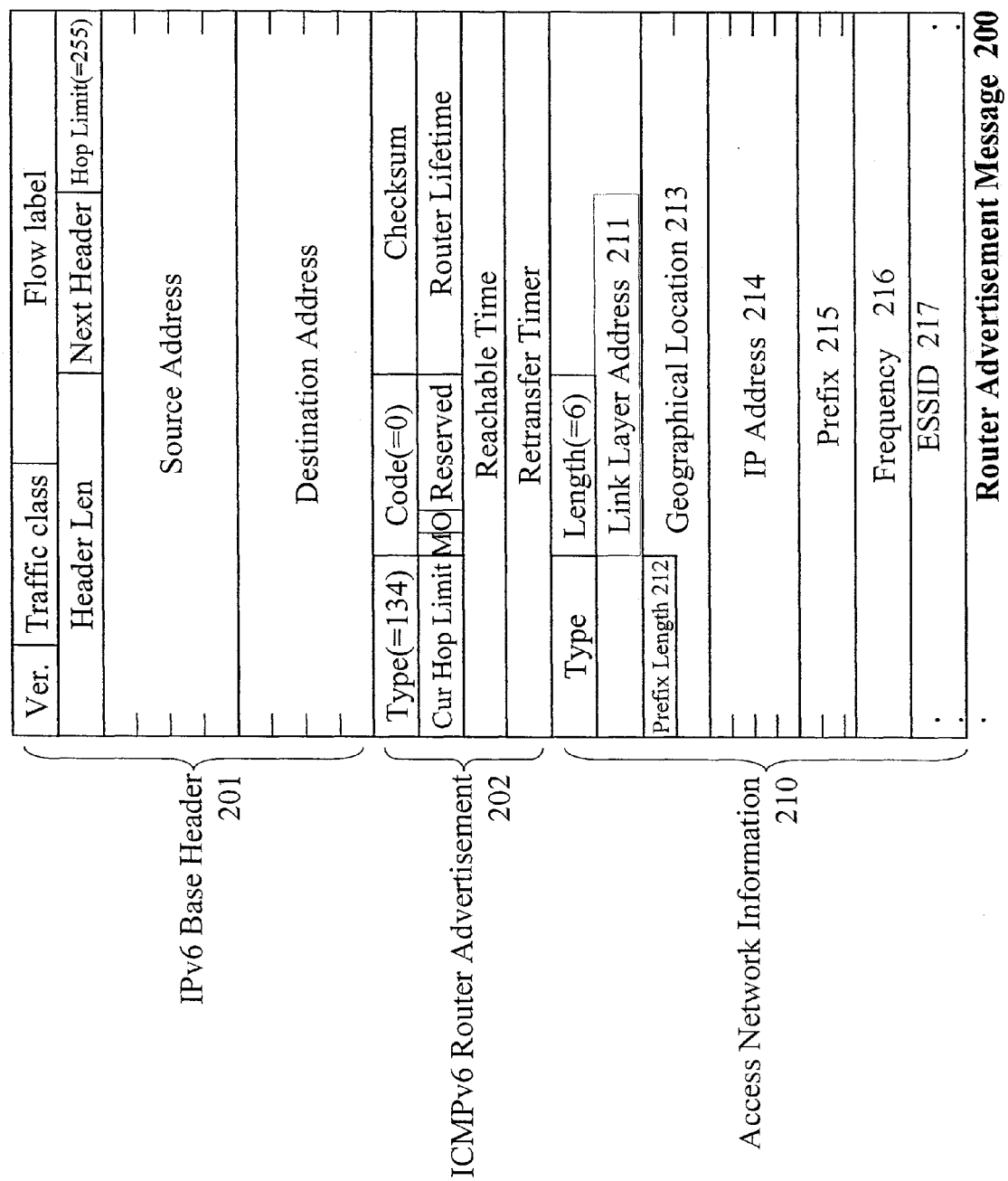
FIG. 11 shows a format of a Router Advertisement Message according to Embodiment 1 of the present invention.

Herein, the format of the Router Advertisement Message 200 is illustrated in FIG. 11. This is the one where Access Network Information Option 210 is newly defined to be added to the Router Advertisement Message specified by IETF RFC2461 (Neighbor Discovery for IPv6). This Access Network Information Option 210 includes a link layer address field 211 for describing a link layer address of an access router, an IP address field 214 for describing the IP address of itself, a prefix field 215 for describing a network prefix, a prefix length filed 212 for describing the prefix length of the network prefix, a location information field 213 for describing location information obtained by the use of GPS or so on, and a frequency information field 216 for indicating the frequency for the radio communication. Further, there may be included an ESSID field 217 for describing ESSID, an identifier for identifying networks in the local network that is configured by a plurality of wireless LAN domains so that the mobile terminal 10 can select a destination network more efficiently. Incidentally, the Access Network Information Option 210 may include information other than the above, wherein the present invention does not limit information to be described. In addition, each value of field in IPv6 Base Header 201 and ICMPv6 Router Advertisement 202 is specified by IETF RFC2461. The Router Advertisement Message 200 can be added more than one Access Network Information Option 210.

Incidentally, the access network information processor 66 may collect access network interface information ahead of delivering of the Router Advertisement Message 200.

Besides, when the access router 60 delivers the Router Advertisement Message 200 to the access networks 51 to 53, it delivers a standardized format of Router Advertisement Message 200 specified by RFC2461, not including the above-described Access Network Information Option 210.

Figure 5:
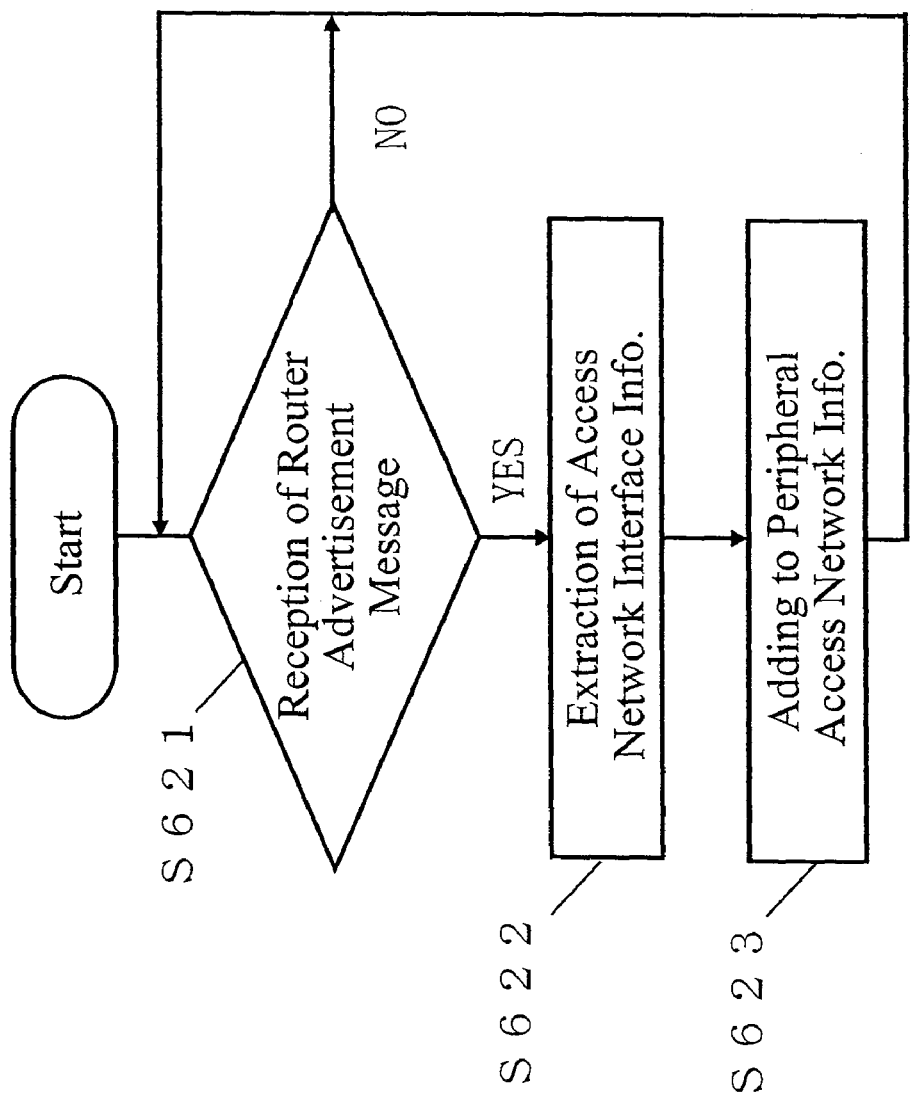
FIG. 5 is a flow chart showing a second operation of the access router according to Embodiment 1 of the present invention.
Figure 6:
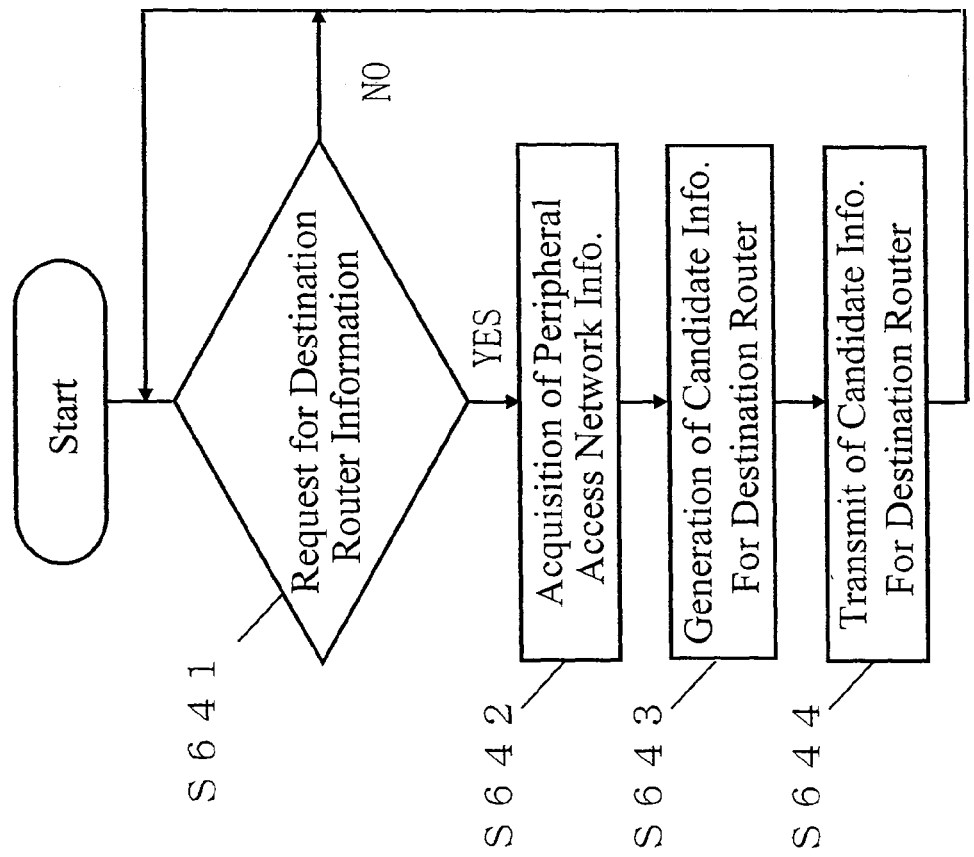
FIG. 6 is a flow chart showing a third operation of the access router according to Embodiment 1 of the present invention.

Next, there is demonstrated the operation of the access router 60 in receiving the Router Advertisement Message 200 from the backbone network 50 with reference to the process flow chart shown in FIG. 5. Incidentally, though the access router 60 does not receive or process the Router Advertisement Message 200 by nature, that is to be an authorized operation in the case of the present embodiment.

First, the Router Advertisement Message 200, after received by the L3 processor 62 from the backbone network 50, is forwarded to the neighbor access network information processor 64 (S621). The neighbor access network information processor 64 extracts the access network interface information including a link layer address, an IP address, a prefix, a prefix length, a location information, a frequency information and an ESSID from the Access Network Information Option 210. The Option 210 is added to the Router Advertisement Message 200 (S622) to register them in the neighbor access network information table. At this time, if there is no corresponding entry, new entry should be added. If there already exists a corresponding entry and there is something to be modified in it, the entry should be updated (S623). If the Router Advertisement Message 200 has more than one Access Network Information Option 210, the neighbor access network information processor 64 extracts each of them.

Herein, the neighbor access network information processor 64 calculates the distance based on the location information on the self-station obtained from the location information controller 67 and the location information included in the access network interface information, to register it into the neighbor access network information table.

Further, the neighbor access network information processor 64 is able to draw up the entries in the order of distance from shortest to longest, as well as to register only the access network interface information obtained from the access router arranged within the distance of Neighbor Constant "C", which specifies the distance measured from the self-location.

FIG. 10 illustrates a data configuration of the neighbor access network information table 70.

This neighbor access network information table 70 is to control the access network information regarding access networks that are connected by the neighbor access routers, which is retained by each of the access routers. Each of the entries 71 to 73 includes an IP address of an access router, a link layer address, a frequency information, a location information, a direct distance from the self-station and information on ESSID.

Incidentally in the step S623, the neighbor access network information processor 64 calculates the direct distance "L" based on the self-location information as well as the location information on the objective access router by using, for example, the following equation $$L=\sqrt{(X1-X2)^2+(Y1-Y2)^2}$$

where "X1, Y1" are values extracted from the Access Network Interface Information at the position of the objective access router, while "X2, Y2" are values indicating the self-location.

In addition, there are provided two methods of storing in the neighbor access network information table 70 to be performed by the neighbor access network information processor 64 as hereinafter described, and only one of them or both of them at the same time can be implemented.

The first storage method is to define the Neighbor Constant "C" as an indicator for determining neighbors, wherein an access router of which distance from the self-station is within the range of "C" is to be treated as a neighbor access router. That is, this method makes it a condition that the distance should not be longer than "C" when describing into the neighbor access network information table 70. For example, in FIG. 10, in the case of the neighbor access network information table 70 of the access router 60a, because the distance values of the entries 71 to 73 for the respective access routers 60b to 60d are all within the range of the Neighbor Constant "C", they can be described in the neighbor access network information table 70 (C>n, m, l). If the distance value of an access router is longer than the Neighbor Constant "C", however, the access network interface information thereof is not to be described in the neighbor access network information table 70. By doing so, it is made possible to provide the mobile terminal with information on an access router that is appropriate as a movement destination from the self-station.

The second method is to draw up the entries 71 to 73 in the order of distance from shortest to longest to be stored. That means, in FIG. 10, entries 71 to 73 are stored in the order of distance from shortest to longest (n<m<l). When storing an access network information having a distance "k" (n<k<m<l), it is to be stored between the entry 71 and the entry 72. By doing so, it is made possible to provide the mobile terminal 10 with information regarding access routers in the order of descending possibility as a movement destination. Incidentally, in FIG. 8, both of the first entries of the neighbor access network information table 70 held by the access routers 60a and 60c are the access network interface information on the access router 60b. Besides, the first entry of the neighbor access network information table 70 held by the access router 60b stores only one of the closer access network interface information between the access routers 60a and 60c.

There is hereinafter demonstrated the operation of the access router device 60 in the case of receiving a Destination Router Solicitation Message 300.

Figure 13:
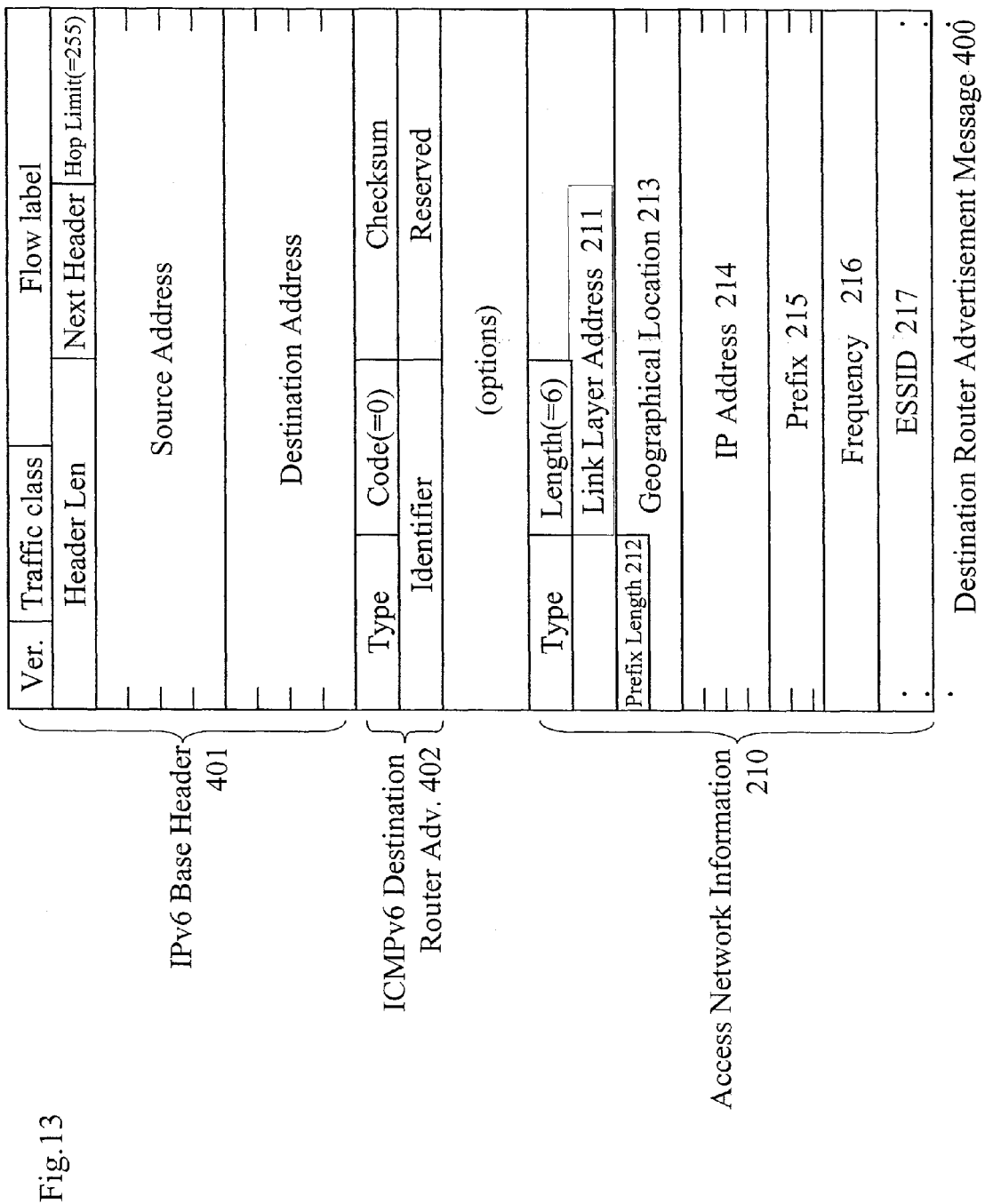
FIG. 13 shows a format of a Destination Router Advertisement Message according to Embodiment 1 of the present invention.

First, a Destination Router Solicitation Message 300 received by the L3 processor 62 via the L1/2 processor 63 is forwarded to the candidate destination router information processor 65 (S641). The candidate destination router information processor 65 obtains neighbor access network information from the neighbor access network information processor 64 (S642), extracts a part/all of the entries as a information for a candidate destination router to be described into a Destination Router Advertisement Message (S643), then forwarding to the L3 processor 62 (S644) in order to send to the mobile terminal 10. The L3 processor 62 sends it to the access network via the L1/2 processor 63. Herein, format of the Destination Router Advertisement Message 400 is demonstrated in FIG. 13. This corresponds to the Destination Router Advertisement Message in the Fast Handover Method examined by IETF, but is further added with an Access Network Information Option 210 in the present embodiment. Incidentally, it is possible to add a plurality of Access Network Information Option 210. In this case, the candidate destination router information processor 65 adds the Access Network Information Option 210 by drawing them up in order of increasing distance 105. By doing so, it is made possible to notify the mobile terminal of the selection preference.

As described above, the access router 60 according to the present embodiment has a function to exchange the respectively-stored access network interface information periodically, or when needed. Therefore it is possible to control which of destination router candidates to be notified to the mobile terminal 10.

Incidentally, if any of the access routers 60 terminates, no more Router Advertisement Message 200 is delivered periodically. As a result, the neighbor access network information processor 64 can delete entries by controlling a reception time and next reception time to be estimated for the Router Advertisement Message 200 about each of the access routers 60. That means, the neighbor access network information processor 64 deletes corresponding entries in the neighbor access network information table when a Router Advertisement Message 200 cannot be received from the access router 60 even after the estimated reception time. Further, when the Router Advertisement Message 200 cannot be received from the access router 60 even after the estimated time, the neighbor access network information processor 64 may send the Router Solicitation Message specified by IETF/RFC2461, and may delete entries after confirming that it is impossible to receive a solicited Router Advertisement Message 200 from the access router 60. Alternatively, in the case where the access router 60 terminates its operation to turn off the power source, or to be cut off from the backbone network 50 or from the access networks 51 to 53, the "Router Lifetime Field" in "ICMPv6 Router Advertisement 202" may be set to "0" and a Router Advertisement Message 200 may be delivered for requesting to delete the access network interface information that is previously delivered by the access router 60.

In addition, each access router 60 may send the Router Solicitation Message to the backbone network 50 so that the neighbor access network information table 70 can be updated to the latest state.

There is demonstrated hereinafter the configuration and basic operation of the mobile terminal 10.

Figure 2:
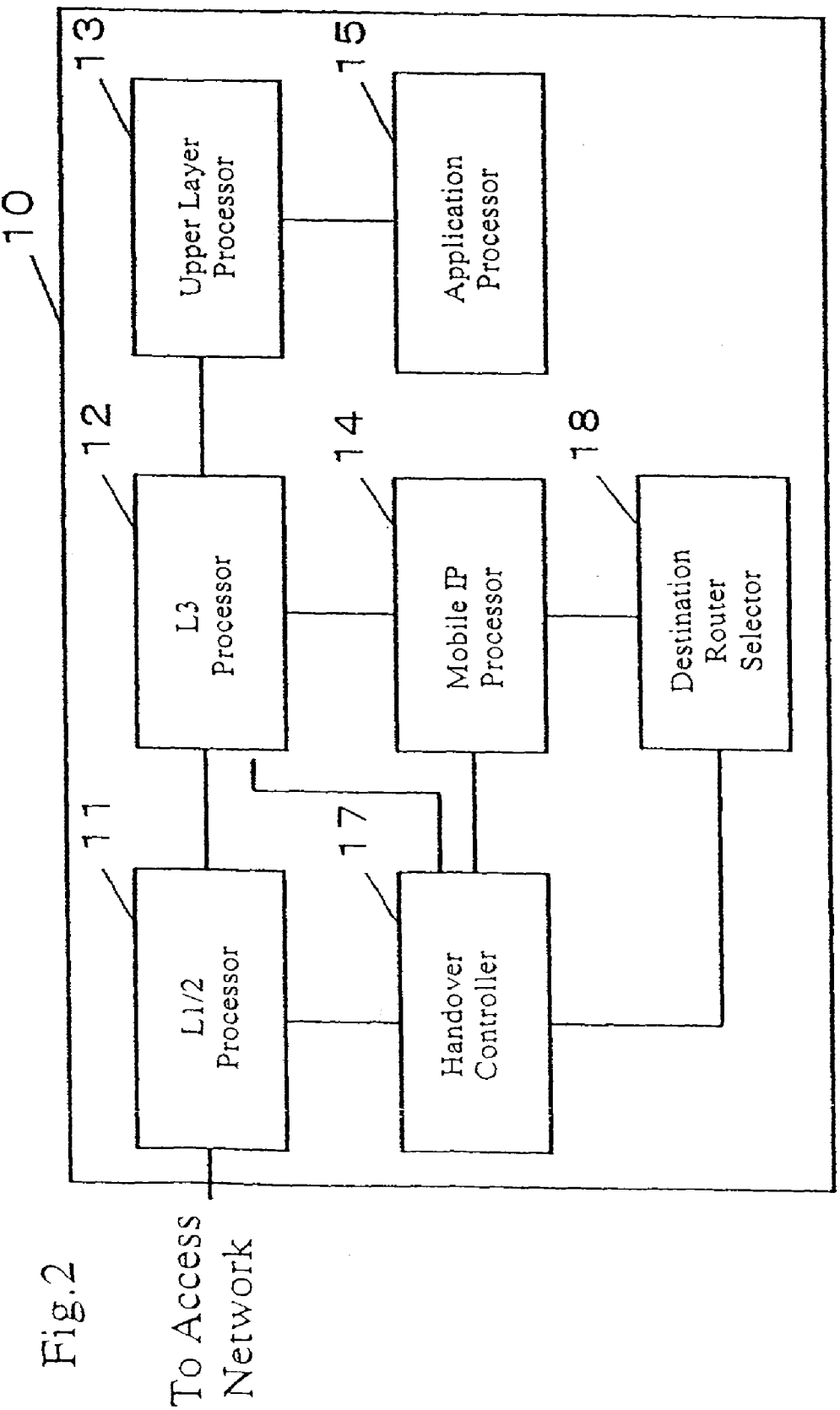
FIG. 2 is a block diagram illustrating a first configuration of a mobile terminal in a mobile communication system according to Embodiment 1 of the present invention.
Figure 3:
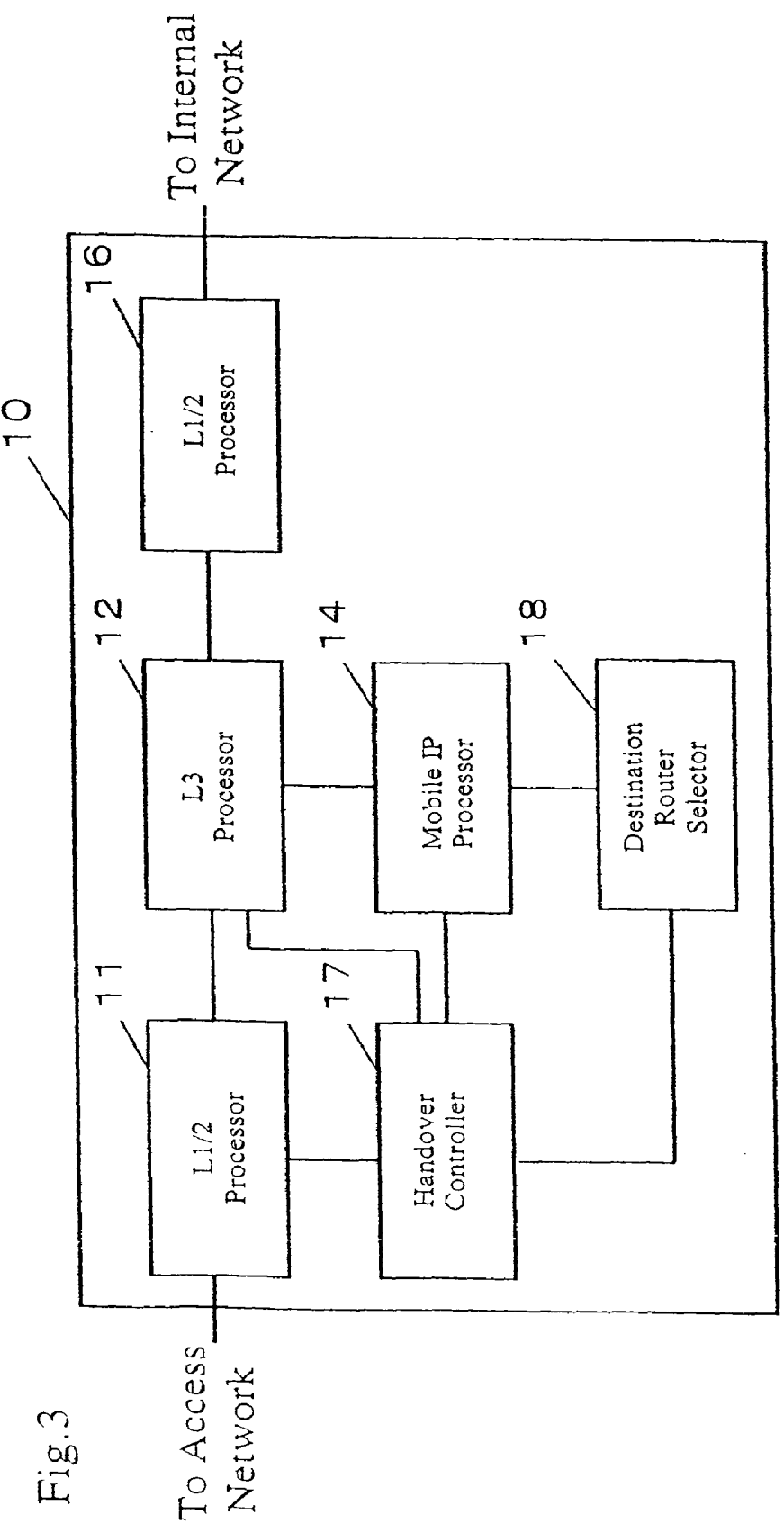
FIG. 3 is a block diagram illustrating a second configuration of the mobile terminal of the mobile communication system according to Embodiment 1 of the present invention.

FIG. 2 and FIG. 3 are block diagrams of the mobile terminal 10. A first L1/L2 processor 11 performs a physical layer processing and a data-link layer processing in order to connect to the access network. A L3 processor 12 performs a network layer processing such as IP protocol. An upper layer processor 13 performs an upper layer processing including TCP and UDP. A Mobile IP processor 14 performs IP mobility management of the mobile terminal on the basis of Mobile IP Procedure. An application processor 15 controls applications. A second L1/L2 processor 16 performs a physical layer processing and a data-link layer processing that is connected to another different network. A handover controller 17 controls a handover processing. A destination router selector 18 controls information regarding access routers that will become a movement destination in performing a handover. A location information controller 19 controls the location information on the self-station. Herein, FIG. 2 represents a configuration where the mobile terminal 10 works as a host while FIG. 3 represents a configuration where the mobile terminal 10 works as a mobile router. Here, if the mobile terminal 10 also implements the Fast Handover Method as examined by IETF, it will perform the relevant processing in the Mobile IP processor 14.

Incidentally, in FIG. 3, there are illustrated only two L1/2 processors 11 and 16, but more L1/2 processors may be included in the configuration, wherein the number thereof to be included is not limited to by the present invention. In addition, even in the case of including three or more of L1/2 processors, it can realize the operation by means of a similar configuration and procedure as described below.

Hereinafter is demonstrated the basic operation of the mobile terminal 10 configured as described above.

The transmitting operation of the mobile terminal 10 according to the present embodiment shown in FIG. 2 is described as below.

First, a transmission data generated by the application processor 15 is forwarded to the L3 processor 12 that implements IP protocol processing, via sockets and the upper layer processor 13 that performs a processing according to protocols including TCP or UDP. As a result of this, IP processing is implemented. At the same time, the Mobile IP processor 14, which is to perform a processing according to Mobile IP procedure, performs an additional IP header processing concerning the Mobile IP.

Then, after a data-link layer processing and a physical layer processing are performed by the L1/2 processor 11, the transmission data is transmitted to the access network at a specific frequency.

Besides, the receiving operation of the mobile terminal 10 according to the present embodiment as shown in FIG. 2 is reverse to the transmitting operation and can be demonstrated as below.

First, after the L1/2 processor 11 receives a packet from the access network to perform a physical layer processing and a data-link layer processing, the L3 processor 12 performs IP protocol processing. At the same time, the Mobile IP processor 14 performs an additional IP header processing that concerns the Mobile IP, then the upper layer processor 13 performs the processing. As a result, data can be forwarded to the application processor 15.

Meanwhile, the transmission/reception operation of the mobile terminal 10 according to the present embodiment as shown in FIG. 3 is almost equal to those as shown in the above. However, instead of the upper layer processor 13 and the application processor 15, there is included the L1/2 processor 16 to be connected to the internal network. That is, in the case of the mobile terminal 10 operating as a router as shown in FIG. 3, as for a packet received from the internal network, the L1/2 processor 16 performs a physical layer processing and a data-link layer processing. After that, the L3 processor 12 performs IP protocol processing including a routing process. Then the packet is to be forwarded to either of the L1/2 processors 11 or 16. Also as for a packet received from the access network, as a result of the routing process conducted by the L3 processor 12 after the processing by the L1/2 processor 11, the mobile terminal 10 is to forward the packet to either of the L1/2 processors 11 or 16. Herein, the Mobile IP processor 14 also implements a standardized mobile router processing in IETF, an applied form of the Mobile IP Procedure, in order to realize a mobility transparency of the internal network.

Figure 7:
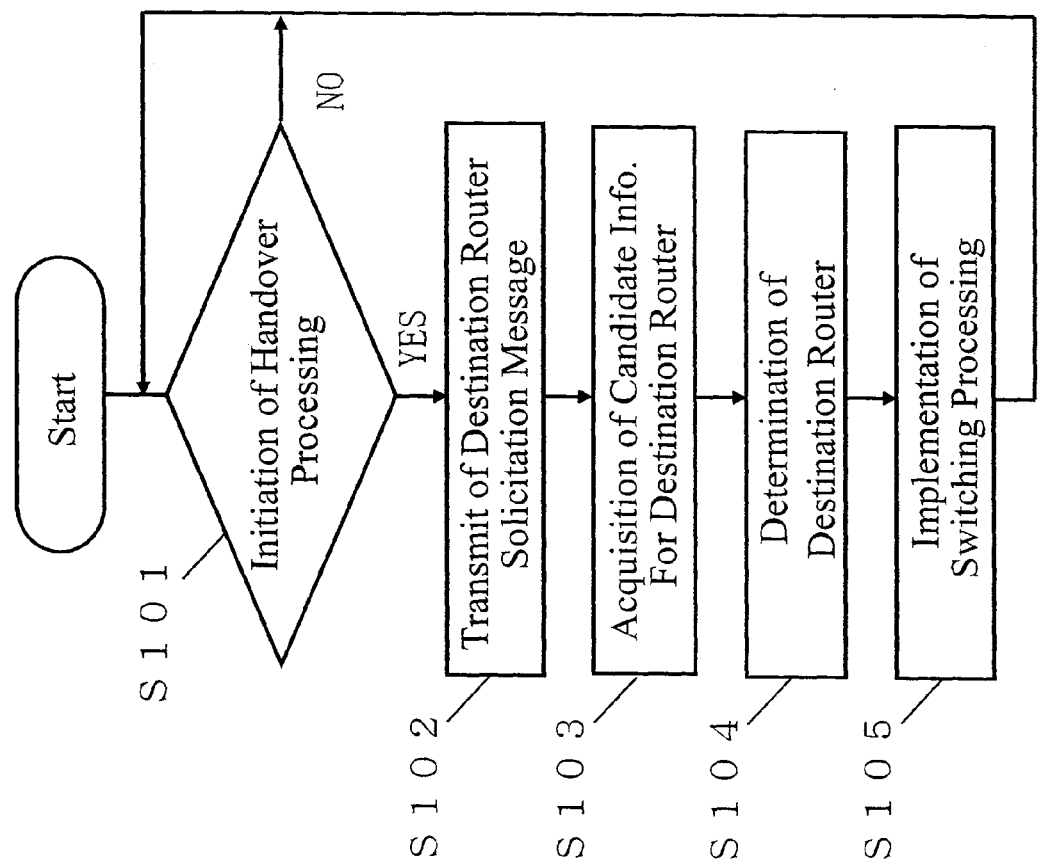
FIG. 7 is a flow chart showing one example of operation of the mobile terminal according to Embodiment 1 of the present invention.

Next is demonstrated a handover processing of the mobile terminal 10 with reference to the process flow chart as shown in FIG. 7.

When the handover controller 17 decides to initiate a handover processing (S101), the destination router selector 18 generates a Destination Router Solicitation Message 300 and forwards it to the Mobile IP processor 14 in order to send it to the access router 60. Then the message is forwarded by the Mobile IP processor 14 to the L3 processor 12, delivered to the access network via the L1/2 processor 11 (S102), and transmitted to the access router 60.

Figure 12:
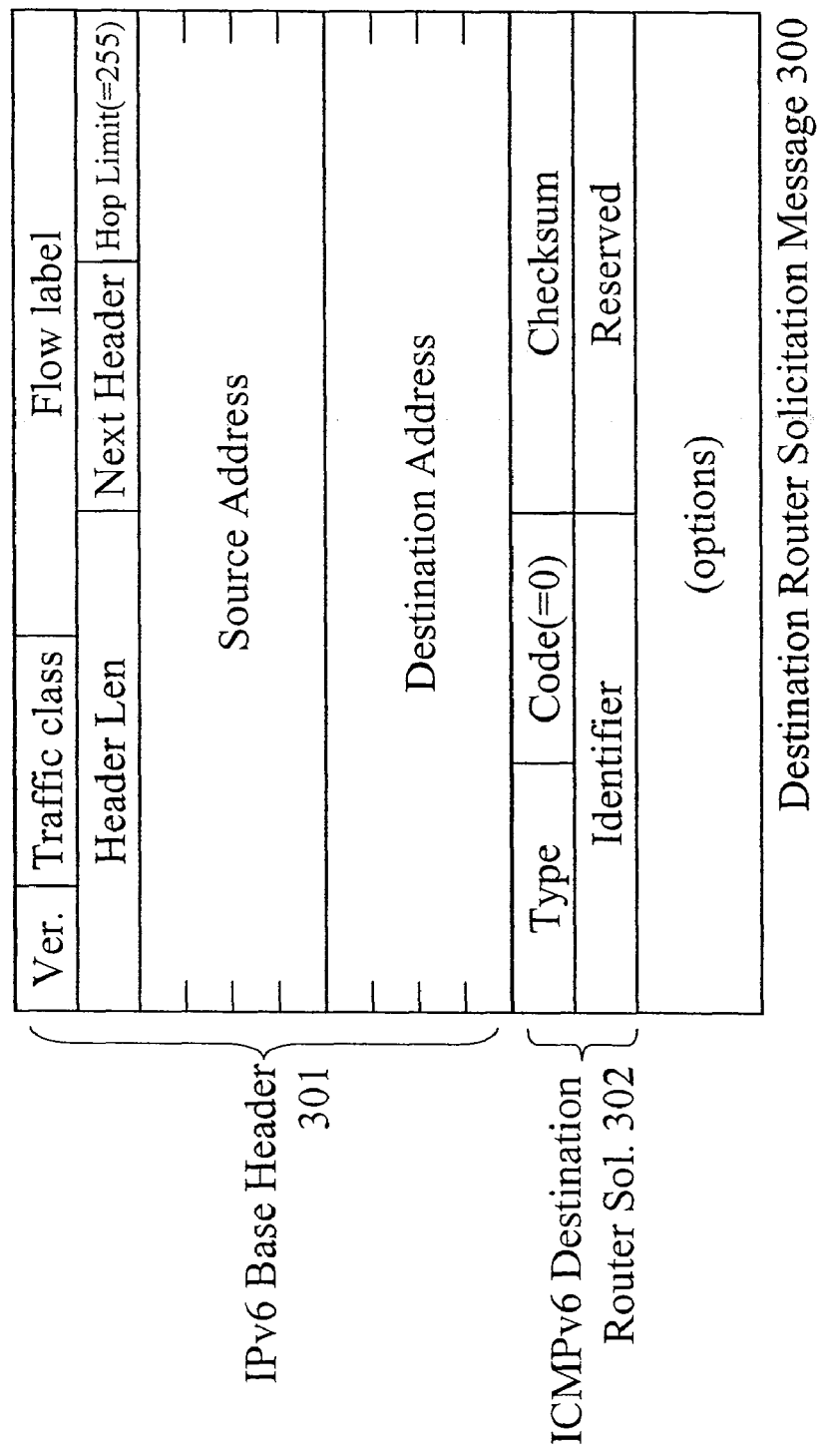
FIG. 12 shows a format of a Destination Router Solicitation Message according to Embodiment 1 of the present invention.

Herein, the format of the Destination Router Solicitation Message 300 is shown in FIG. 12. This message corresponds to the Router Solicitation for Proxy Message in the Fast Handover Method in IETF.

And then, when the L3 processor 12 receives a Destination Router Advertisement Message 400 from the access router 60 via the L1/2 processor 11, the message is forwarded to the Mobile IP processor 14. Mobile IP processor 14 then extracts information for a candidate destination router (S103).

Though the Mobile IP processor 14 performs a processing concerning IETF Fast Handover Method as well, if the Destination Router Advertisement Message 400 includes information for only one candidate destination router, the Mobile IP processor 14 is to determine it as the destination router (S104) and initiate a switching processing with the use of the information for the candidate destination router obtained in the step 103 (S105). If the Destination Router Advertisement Message 400 includes information for a plurality of candidate destination router, then the Mobile IP processor 14 forwards the information for candidate destination routers to the destination router selector 18. The destination router selector 18 selects an access router having the highest selection preference among all of the information for candidate destination routers to determine it as a movement destination router (S104). Then information on the access router that is determined as a movement destination router by the Mobile IP processor 14 is forwarded to the Mobile IP processor 14 being to implement the switching processing (S105). Incidentally as for the selection preference order, the mobile terminal 10 can take control of the preference because the information for a candidate destination router is, when delivered from the access router, transmitted in a format that is arranged in the order of descending selection preference. Herein, the mobile terminal 10 may determine an access router as its destination router not only in view of the preference but also in view of a connectable ESSID equipped, then may implement the subsequent steps after S105 in a similar way. By doing so, it can avoid such a useless processing as trying to connect with an access router that is actually unable to connect. Further, it is possible to determine a destination router by detecting the field intensity of radio communication received by the L1/2 processor 11, selecting an access router that receives stronger field intensity than a predetermined value out of candidate routers.

Besides, because the L1/2 processor 11 can obtain a frequency to be received from the frequency information 216 in the Destination Router Advertisement Message 400, it is made possible to receive radio signals from a destination access router at a specific frequency without any search.

In addition, delivery of the Destination Router Solicitation Message 300 (S102) may be implemented before the initiation of handover, and it is also possible to periodically update the destination router information in advance in preparation for handover occurrence. In this case, after the Mobile IP processor 14 or the destination router selector 18 finally determine a destination router, the processing is once entrusted to the handover controller 17. Then, after the handover controller 17 decides to initiate the handover processing (S101), the switching processing is performed with the use of the previously determined destination router information (S105). At this time, the processing S102 to S104 may be re-implemented. Or, it may be omitted and then the switching processing may be performed with the use of the previously obtained information.

As described above, the mobile terminal 10 of the present invention enables to determine an access router to move through handover in advance on the basis of information for a candidate destination router provided from the access router 60. As a result, it can realize the reduction of uncertain handover occurrence as well as fast connection to the next access router, enabling to reduce packet loss.

In the mobile communication system as shown in FIG. 8 that is configured by the mobile terminal 10 and the access router 60 operating as described above, there is demonstrated the operation of the mobile terminal 10 hereinafter as proceeding through the passageway 100 from radio area 51 to radio area 53 by way of radio area 52.

Figure 14:
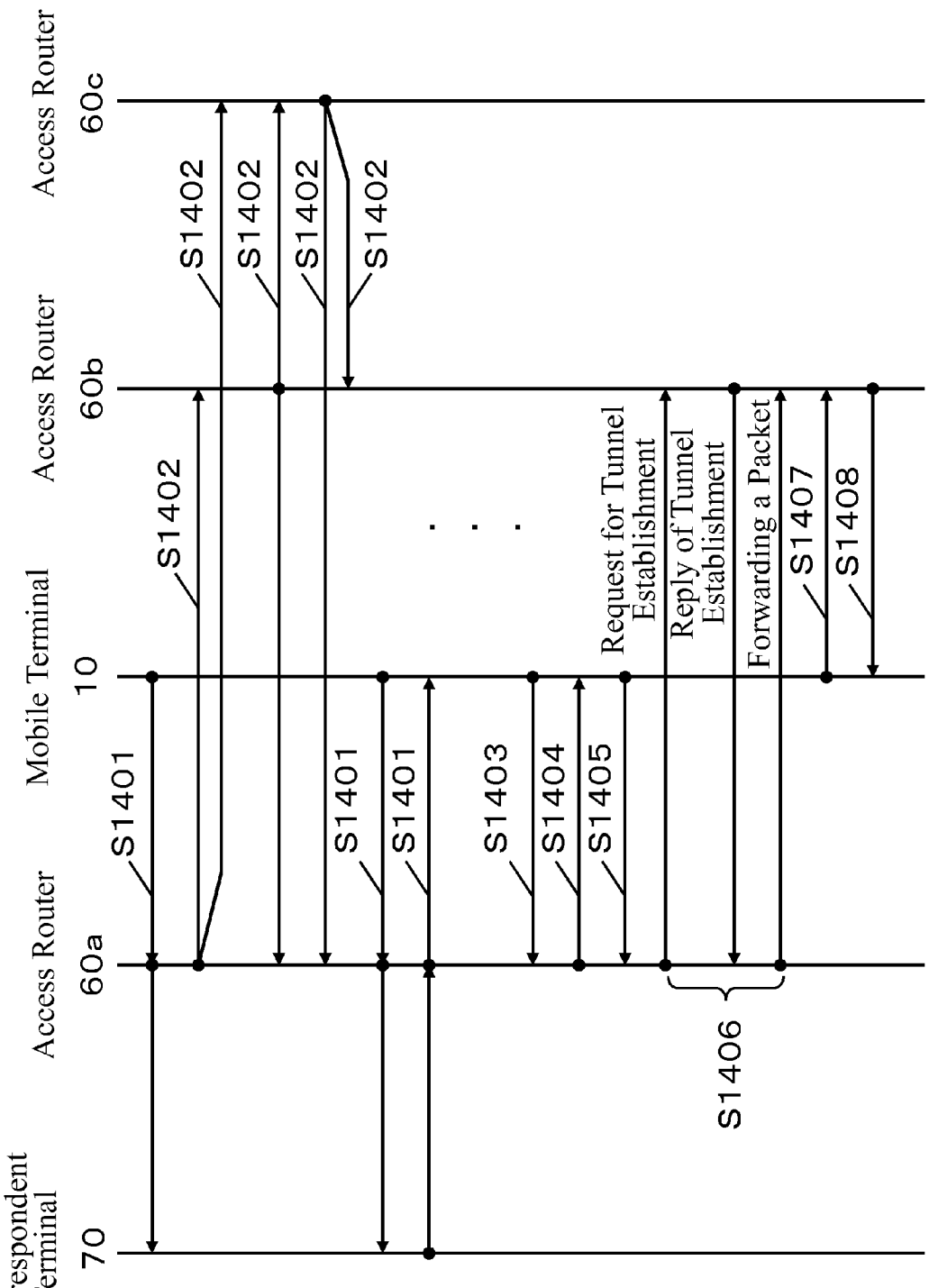
FIG. 14 is a sequence diagram showing an operation of the mobile communication system according to Embodiment 1 of the present invention.

FIG. 14 is a sequence diagram illustrating the operation of the mobile communication system according to the present embodiment.

First, the mobile terminal 10 is connected to the access router 60a via the access network 51 and further communicates with a communication correspondent 70 in an external network that is not shown via the access router 60a (S1401).

This time, in order to provide the mobile terminal 10 with information regarding a destination access router, the following processing is to be performed among the access routers 60a to 60c ahead of handover processing for the mobile terminal 10. That is, access routers 60a to 60c collect information regarding the each of the access network interfaces connected to the access networks 51 to 53 respectively and perform a multicast communication of the Router Advertisement Message 200 periodically or on-demand to the other access routers via the backbone network 50 (S1402). Incidentally, in the case of used in combination with the Fast Handover Method examined by IETF as access network interface information, at least the IP address and the link layer address should be provided. Further, in order to efficiently determine a destination access router, the location information is to be included.

Next, in the handover or in preparation for the handover from the radio area 51 to a next unknown radio area, the mobile terminal 10 sends a Destination Router Solicitation Message 300 to the access router 60a for requesting for information on the destination access router (S1403).

Next, the access router 60a, when receiving the Destination Router Solicitation Message 300, describes only the head entry or all-entries information from the neighbor access network information table 70 into the Destination Router Advertisement Message 400 and sends it to the mobile terminal 10 (S1404).

Next, the mobile terminal 10 determines the access router 60b, which has the highest preference, as its destination router, on the basis of the received Destination Router Advertisement Message 400. In the case of applying the Fast Handover Method examined by IETF, a Fast Binding Update Message is to be sent to the access router 60a (S1405) to go through the fast handover processing (S1406).

Next, the mobile terminal 10 performs a connection request against the access router 60b with the use of the frequency obtained from the frequency information 216 in the Destination Router Advertisement Message 400 (S1407). The access router 60b, in receiving this connection request, replies the connection authorization after performing an authorization processing (S1408).

Since then, the mobile terminal 10 communicates with the communication correspondent 70 and the access router 60b. And further, in moving from the radio area 52 to the radio area 53, handover from the access router 60b to the access router 60c is to be performed in a similar way.

As described above, according to the present embodiment, it is possible to automatically obtain information for estimating a destination access router in real time because access routers can exchange information regarding access network interface held by each of the access routers therebetween. Further, because access routers can notify the mobile terminal of an access router that is to become the movement destination on the basis of the above information, it is possible for the mobile terminal to select a destination access router without fail.

As described above, according to the present invention, it is possible to substantially reduce the configuration load especially in a large-scale network environment. Besides in the case of a new router being added, information on access network interface can be automatically obtained without waiting for the information stored via the mobile terminal. As a result, it is made possible to notify the mobile terminal of real-time information on a destination router candidate. Further, uncertain handover occurrence can be suppressed while realizing a smooth connection to the next access router, thus enabling the reduction of packet loss.

2nd Exemplary Embodiment

The second embodiment of the present invention is demonstrated hereinafter with reference to the drawings.

Figure 9:
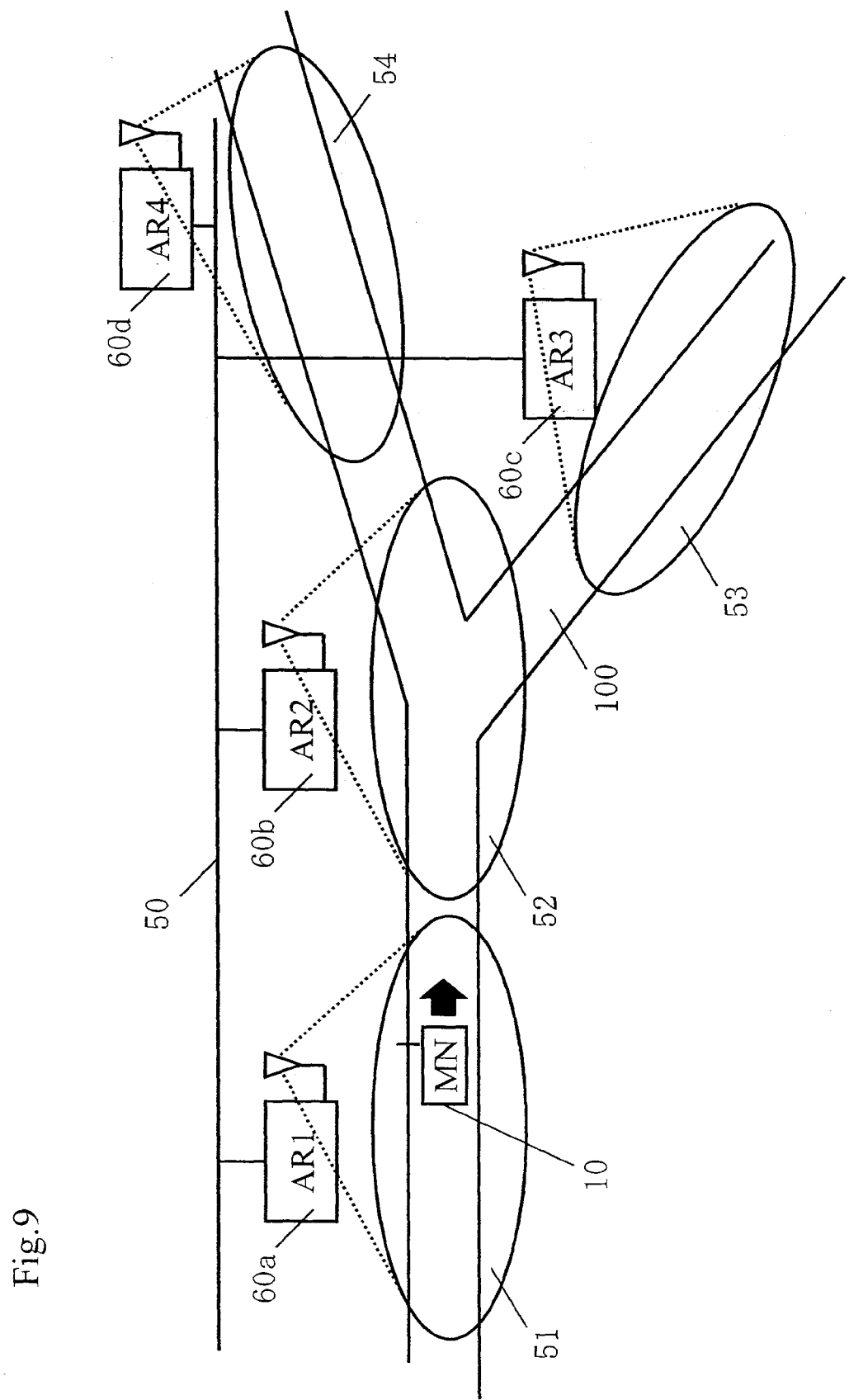
FIG. 9 is a diagram illustrating a configuration of the mobile communication system according to Embodiment 2 of the present invention.

FIG. 9 shows a configuration of a mobile communication system according to the present invention, which is different from first embodiment shown in FIG. 8 in that the passageway 100 diverges in two directions and an access router 60d is arranged along the branched passageway. Incidentally, a radio area 54 is the area capable of performing radio communication with the access router 60d, and hereinafter also described as an access network for connecting between the access router 60d and the mobile terminal 10.

In the above mobile communication system, the access routers 60a to 60d that form the radio areas 51 to 54 arranged along the passageway 100 are connected to the backbone network 50. The mobile terminal 10 goes through the passageway 100 and can communicate with the access routers in respectively different frequency bands. During this, the mobile terminal 10 performs a handover in moving from the radio area 51 to 52, then from the radio area 52 to 53.

Next, there is demonstrated the configuration of each of the devices and their operations with reference to the drawings. Incidentally, as for access routers, configurations and operations are kept in the same way.

Figure 15:
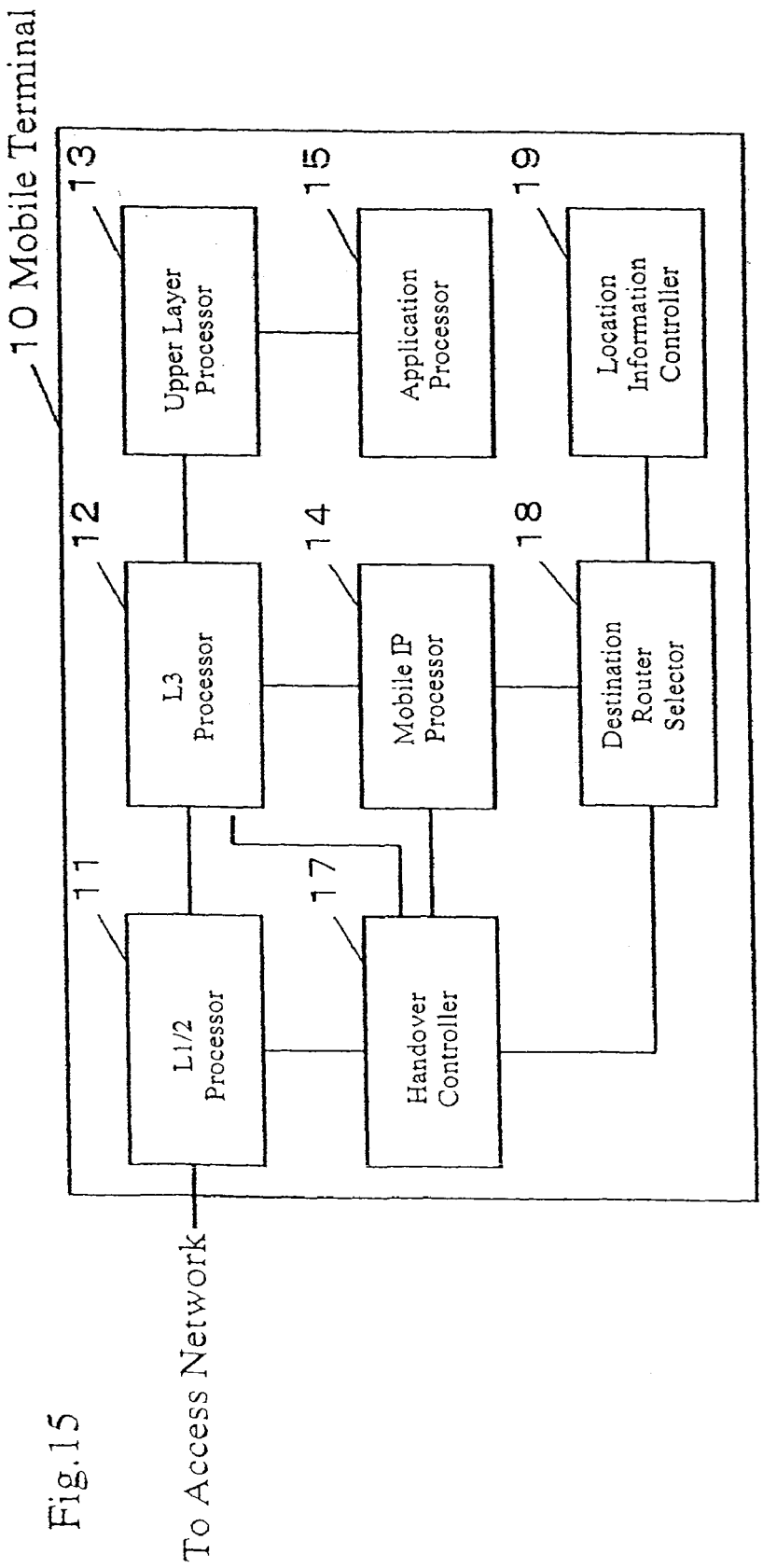
FIG. 15 is a block diagram illustrating a configuration of the mobile terminal according to Embodiment 2 of the present invention.
Figure 16:
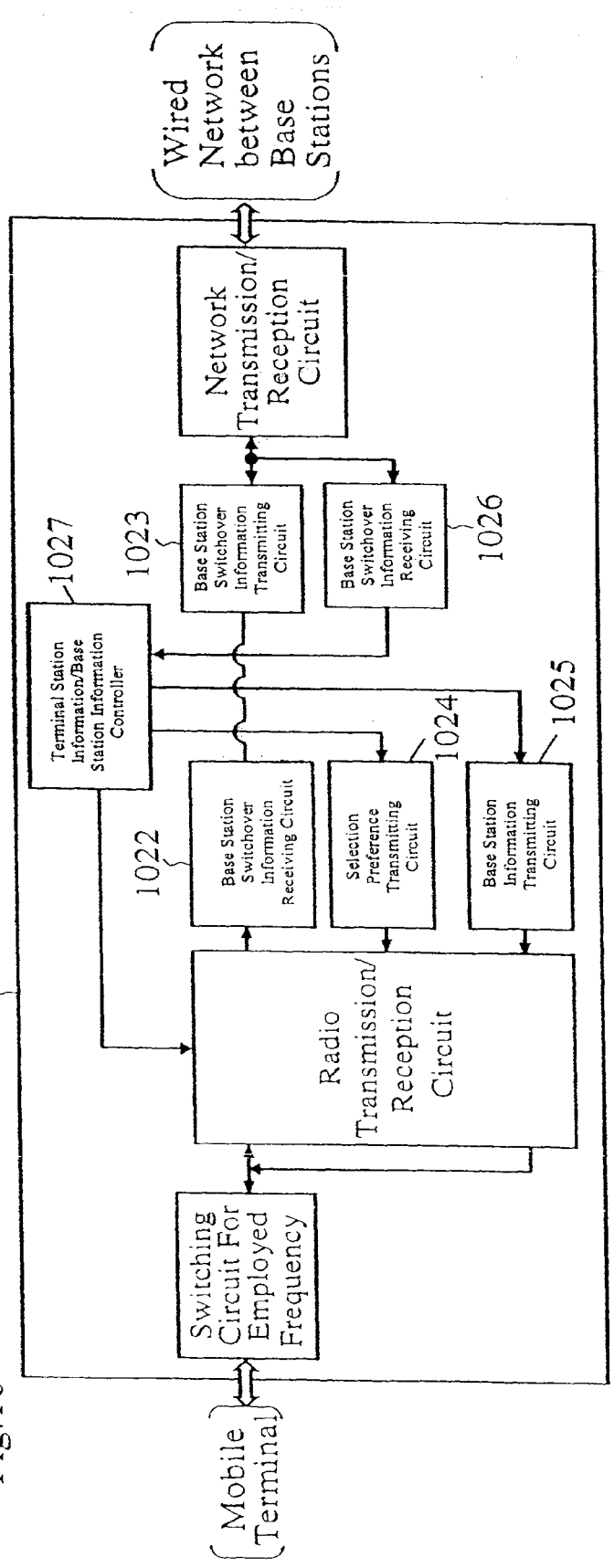
FIG. 16 is a block diagram illustrating a configuration of the conventional mobile communication system.

The configuration of the mobile terminal 10 is illustrated in FIG. 15, which is different from the first embodiment in that there is a location information controller 19.

This location information controller 19 is to detect the location of self-station by means of GPS or so on, for controlling the results as location information.

As for the basic operation of the mobile terminal 10 according to the present embodiment, there is only demonstrated hereinafter what is different from the first embodiment.

In FIG. 7 showing a handover processing by the mobile terminal 10, the steps S101 to S103 are kept in the same way as in the case of the first embodiment.

In the step S104, if the Mobile IP processor 14 extracts information for a plurality of candidate destination routers, the destination router selector 18 selects the closest access router to be decided as a destination router, on the basis of the location information of self-station obtained from the location information controller 19 and the location information of the access routers 60 included in the information for candidate destination routers (S104). Then, information on the access router to be decided as the destination router is forwarded to the Mobile IP processor 14. The Mobile IP processor 14 then performs a switching processing (S105). Besides, in the same way as first embodiment, the mobile terminal may determine an access router as its destination router not only in view of the shortest distance from the self-location but also in view of a connectable ESSID equipped, then continuing the subsequent processing after S105 in a similar way. By doing so, it can avoid such a useless processing as trying to connect with an access router that is actually unable to connect. Further, it is also possible to decide a destination router by detecting the field intensity of radio communication received by the L1/2 processor 11, selecting an access router that receives stronger field intensity than a predetermined value out of candidate routers.

In this manner, the mobile terminal of the present invention can determine an access router to be its movement destination through handover in advance with a certainty, on the basis of the location information of self-station and the information for a candidate destination router given by access routers. As a result, it allows to reduce the occurrence of uncertain handover and realize a smooth connection to a next access router, thus reducing a packet loss. In addition, because frequency to be received by the L1/2 processor 11 can be obtained from the frequency information 216 in the Destination Router Advertisement Message 400, it is made possible to receive a radio signal at a specific frequency that is sent from the destination access router without a search.

In a mobile communication system as shown in FIG. 9, which is configured by the access routers 60 and the mobile terminal 10 operating as in the above, there is demonstrated the operation of the mobile terminal proceeding along the passageway 100 from the radio area 51 to the radio area 53 by way of the radio area 52.

There is demonstrated the operation in moving from the radio area 52 to the radio area 53.

Also in this case, though the access router 60b receives a Destination Router Solicitation Message 300 from the mobile terminal 10 in the same procedure, the access router 60b herein describes all of a plurality of entries having a short distance value into a Destination Router Advertisement Message 400 at the neighbor access network information table 70, and notify to the mobile terminal 10. For example, the neighbor access network information table 70 of the access router 60b stores the access network interface information of access routers 60a, 60c and 60d because of their short distance values. In order to select the access router 60c, which is the proper one to be selected by the mobile terminal 10, there is a necessity of information indicating that the location of the mobile terminal 10 is coming closer to the access router 60c. Because the mobile terminal 10 can easily know its self-location, the access router 60b notifies the mobile terminal 10 of information on a plurality of destination candidates. Then the mobile terminal 10, in receiving the information, finally selects/determines the access router 60c on the basis of its self-location.

Besides, it is also possible that the mobile terminal 10 sequentially notifies the currently connected access router of its self-location information, the access router 60b constantly controlling the location information of the mobile terminal 10 and determining the most suitable access router 60c to be notified.

In this manner, according to the present embodiment, the mobile terminal can select an access router by itself among those as the next connection candidates that are notified from the current access router, on the basis of its self-location. As a result it is made possible to make the most suitable selection of a destination access router with a certainty.

As described above, according to the present invention, it is made possible to substantially reduce the configuration load especially in a large-scale network environment. Further, it enables to make a selection of a destination access router with a certainty. As a result, uncertain handover occurrence can be suppressed and a smooth connection to the next access router can be realized, thus reducing a packet loss.

What is claimed is:

1. A handover method comprising:
    prior to a handover;
    multicast-sending, by at least one first wireless base station on an access network, access network interface information at a specific radio frequency toward a wired backbone network, the access network interface information including respective location information for the at least one first wireless base station;
    determining, by a second wireless base station, a value for a distance from the at least one first wireless base station to a second wireless base station, using the respective location information included in the access network interface information received via the backbone network; and
    generating, by the second wireless base station, neighbor access network information according to the respective determined value for the distance from the at least one first wireless base station to the second wireless base station;
    when the wireless base station decides to perform handover for a mobile terminal:
    notifying, by the second wireless base station, a handover notification containing at least a part of the neighbor access network information, and
    selecting, by the mobile terminal, a destination wireless base station based on the handover notification and communication quality;
    wherein the determining, by the second wireless base station, includes determining whether the respective determined value for the distance of each of the at least one first wireless base station to the second wireless base station is within a range of a predetermined distance on the basis of the respective location information, to handle one or more of the corresponding access network interface information of the at least one first wireless base station within the range of the predetermined distance as the respective neighbor access network information; and
    wherein the selecting, by the mobile terminal, includes selecting an wireless base station having a shortest respective determined distance and better communication quality as the destination wireless base station on the basis of the handover notification.

2. The handover method according to claim 1, further comprising:
    deleting from neighbor access network information in the generating step, by the second wireless base station, the first wireless base station not receiving the access network interface information at estimated receiving time of the access network interface information received by the first wireless base station, or the first wireless base station having sent a deleting request signal.

3. The handover method according to claim 1,
    further storing, by the second wireless base station, the access network interface information as the respective neighbor access network information in an order of increasing respective distance.

4. The handover method according to claim 1,
wherein the notifying, by the second wireless base station, includes notifying the handover notification included in the respective neighbor access network information, as a candidate destination router information, after arranging the access network interface information in an order of increasing respective determined distance.

5. The handover method according to claim 1,
wherein the access network interface information includes a network identifier for identifying the access network, and
the selecting, by the mobile terminal, includes selecting the destination wireless base station out of the at least first wireless base station with a connectable network identifier on the basis of the handover notification.

6. A wireless base station comprising:
an access network information receiving section operable to receive, from at least one other wireless base station via a backbone network, respective access network interface information of the at least one other wireless base station, the respective access network interface information including respective location information for the at least one other wireless base station;
a neighbor access network information processor operable to determine a value for a distance from the at least one other wireless base station to the wireless base station, using the respective location information included in the received access network interface information;
a handover notification determining section operable to determine a handover notification based on the value for the distance from the at least one other wireless base station to the wireless base station;
a transmitter operable to send to a mobile terminal the handover notification when deciding to perform handover for a mobile terminal; and
a location information controller operable to detect a self-location of the wireless base station;

wherein the neighbor access network information processor adds the self-location as corresponding location information to the access network interface information for transmission;
wherein the neighbor access network information processor is operable to determine whether the respective determined value for the distance of each of the other wireless base stations to the wireless base station is within a predetermined distance on the basis of the received respective location information and the self-location obtained from the location information controller, to store the corresponding access network interface information of the other wireless base stations within the predetermined distance as the respective neighbor access network information in an order of increasing respective determined distance; and
wherein the access network interface information includes at least, radio frequency information for communication with the access network, and a respective network identifier for identifying the access network.

7. The wireless base station according to claim 6, wherein the wireless base station, at the neighbor access network information processor, deletes another wireless base station not receiving the access network interface information at estimated receiving time of the access network interface information received by the another wireless base station, or the another wireless base station having sent a deleting request signal, from neighbor access network information.

8. The wireless base station according to claim 6, wherein the handover notification determining section is operable to extract the corresponding access network information of the other wireless base stations having the respective determined value of the distance or communication quality within a range of the predetermined distance or the communication quality from the neighbor access network information processor, arrange the extracted access network interface information in an order of increasing respective determined distance or the communication quality as a candidate destination wireless base station information, and notify the handover notification.

* * * * *

UNITED STATES PATENT AND TRADEMARK OFFICE
CERTIFICATE OF CORRECTION

PATENT NO. : 8,169,970 B2  Page 1 of 1
APPLICATION NO. : 12/401931
DATED : May 1, 2012
INVENTOR(S) : Shinkichi Ikeda It is certified that error appears in the above-identified patent and that said Letters Patent is hereby corrected as shown below:

On the Cover Page, item [56], References Cited:

FOREIGN PATENT DOCUMENTS
"JP 2002-112306 A 12/2000"

should read

--JP 2002-112306 A 4/2002--

Signed and Sealed this
Tenth Day of July, 2012

David J. Kappos
*Director of the United States Patent and Trademark Office*